INVENTOR.
Rudolf Weber
BY
Watson, Cole, Grindle & Watson
Attys.

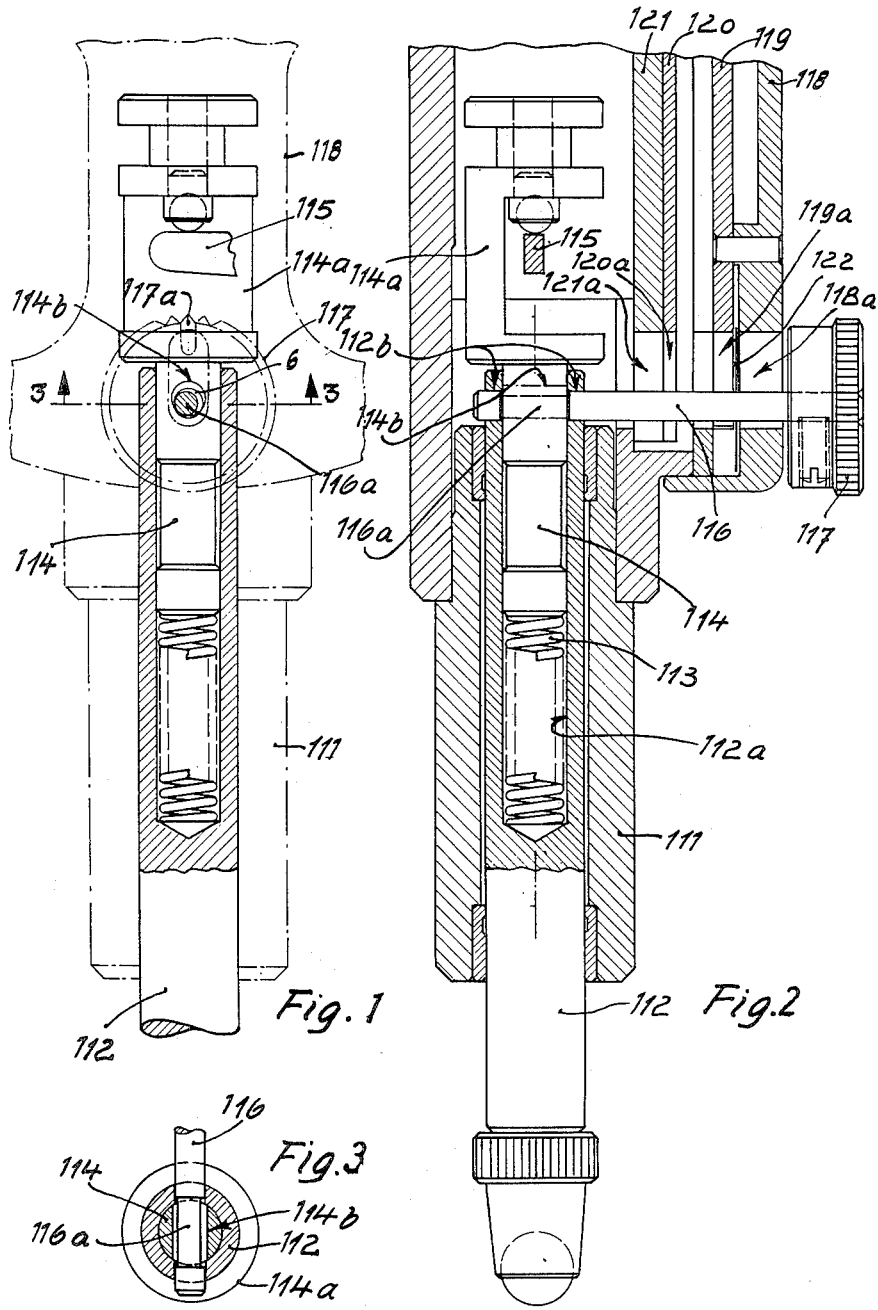

United States Patent Office 3,066,420
Patented Dec. 4, 1962

3,066,420
MECHANICAL DIAL GAUGE
Rudolf Weber, Schramberg, Germany, assignor to
Gebruder Junghans A.G.
Filed Dec. 14, 1956, Ser. No. 628,354
Claims priority, application Germany Dec. 15, 1955
3 Claims. (Cl. 33—172)

The invention relates to mechanical dial gauges, that is length measuring instruments, in which the deflection of the measuring plunger is increased by a lever mechanism and transmitted to an indicating device. To enable a fine adjustment of the indicator in these instruments which are hereinafter referred to as "fine feelers," a fine adjustment device is provided on the dial gauge so as to impart a displacement movement to the indicator drive independently of the influence exerted on the measuring plunger by the test piece and the local position of the gauge. In a preferred form of construction of the invention the measuring mechanism is bodily connected with the housing, for example flanged thereon, the connection being yieldable and preferably elastic, the fine adjusting device engaging the measuring mechanism. The connection can be either permanent or detachable, direct or indirect. The connection between the measuring mechanism and housing is preferably elastic only perpendicularly to the plane of the scale, but rigid in all other directions. The measuring mechanism is seamed to the rear wall of the housing by means of fixing lugs formed on a mechanism plate, preferably the front plate of the mechanism and preferably having a wekened cross-section, whereas the upper edge of the mechanism plate has an engagement surface for a fine adjustment pressure screw which can be manipulated from outside the housing. It is advisable to make the mechanism plate which is provided with the connecting lugs considerably shorter in width than in length, for example a width of less than half the radius of the housing.

It is advantageous to arrange the elastic connection between the measuring mechanism and the housing symmetrically to the central longitudinal plane of the instrument and also to arrange the line of action of the fine adjustment force in this plane. In the case of fine adjustment the front plate, for example, will then be bent slightly forward or backward. The end of the so-called elbow-lever cooperating with the head of the measuring plunger thereby rises or sinks slightly as intended, whereas, on the other hand the relative position between the indicator axle and the scale carrier remains entirely uninfluenced, so that the errors can be introduced into the system through the fine adjustment.

In another preferred form of construction of the invention the measuring plunger is made telescopically extensible and retractable for the purpose of effecting the fine adjustment. For this purpose the measuring plunger may comprise an outer part and an inner part, whereby an eccentric device can extend transversely through both the parts so as to move them relatively to each other. The eccentric device operates against a counter-pressure spring the resilient resistance of which is considerably greater than the measuring force. In a preferred form of construction the measuring plunger is provided with an axial bore extending from its inner end for receiving the counter-pressure spring and a telescopic pin, the outer end of which carries the head piece cooperating with the end portion of the indicator gear and in the measuring plunger an eccentric shaft is mounted which extends through the gauge housing preferably to the front side thereof and is provided with a setting handle or knob.

Other forms of construction of telescopically extensible and retractable measuring plungers are possible; they will be hereinafter described in conjunction with examples of forms of construction of the invention.

Other features and advantages of the invention will be disclosed by the following description of several constructional examples, by the drawings and the claims.

In the drawings:

FIG. 1 shows a detail of the invention in front elevation and part section,

FIG. 2 is a sectional side elevation of FIG. 1,

FIG. 3 is a section on line 3—3 of FIG. 1,

Figure 4:
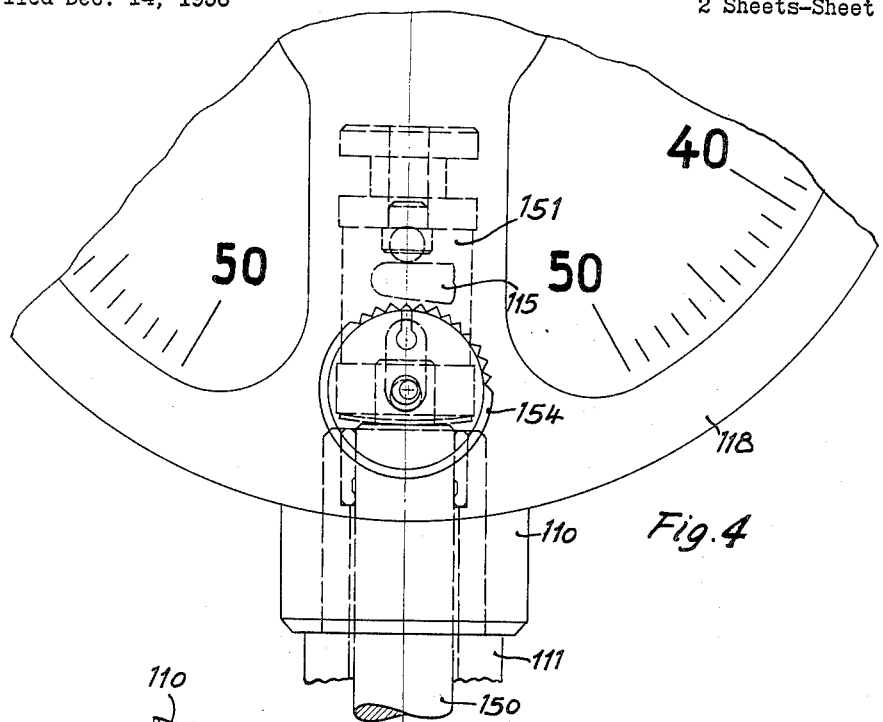
FIG. 4 is a front elevation showing means for extending and retracting the measuring elements.
Figures 5, 6:
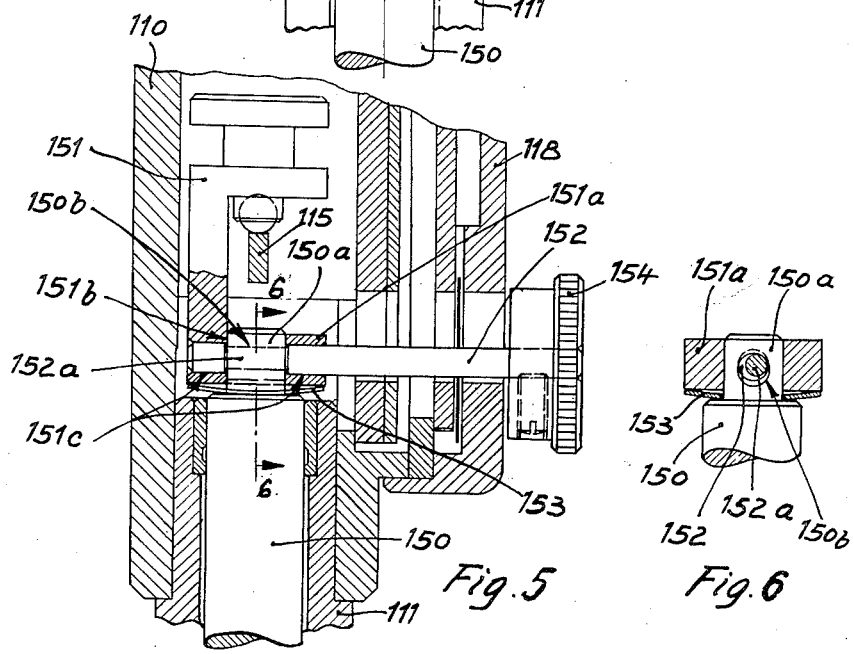
FIG. 5 is a vertical section through the center line of FIG. 4.
FIG. 6 shows a detail of FIG. 5 taken on line 6—6 of FIG. 5.

Referring now to the drawing, FIGS. 1 to 3, shows the housing of the dial gauge designated by 110, a guide sleeve by 111, and the measuring plunger by 112. This plunger has in its inner end surface a bore 112a in which a counter-pressure spring 113 is placed and in which a telescopic pin 114 is also slidably guided within the bore 112a. The telescopic pin 114 carries on its upper end a head 114a which cooperates with the end part 115 of the indicator gear (not otherwise shown). Near its upper end the measuring plunger 112 is provided with a bearing bore 112b for receiving the eccentric shaft 116. The eccentric machined on the shaft 116 is designated by 116a. It cooperates with the transverse bore 114b extending through the telescopic pin in such a manner that, by turning the shaft 116, as the parts 114 and 116a are in intersurface contact under the action of the counter-pressure spring 113, the telescopic pin 114 will be pressed into or allowed to move out of the measuring plunger 112.

A setting knob 117 with indicator mark 117a is fitted on the outer end of the eccentric shaft. When the indicator mark 117a is at the top the eccentric 116a is in the most favourable position, that is, it is possible to correct the length of the measuring plunger by the same amount in upward or downward direction.

Slots 118a, 119a, 120a, 121a are provided in the glass edge 118 of the housing and also on the housing part 119, as well as the mechanism parts 120 and 121, for the shank of the eccentric shaft 116. This shaft also carries a disc 122 which serves as dust excluding disc and slides in a free space provided between the housing parts 118 and 119.

The arrangement according to the invention possesses the advantage that the fine adjustment can be made directly on the measuring plunger and therefore the measuring range of the dial gauge can be utilized to its full extent. This is, for example, not possible in the case of zeroizing arrangements in which the dial is turned when modern housing shapes are used where the dials are of segment shape. As compared with one known zeroizing arrangement wherein the measuring mechanism is displaced entirely or partly in relation to the housing, the arrangement above described possesses the advantage that measuring mechanism and measuring plunger maintain their relative positions and as a result a displacement between the measuring plunger and the end part of the indicator gear, that is a change in the ratio of transmission, is avoided.

I claim:

1. Mechanical dial gauge for length measurements with fine adjustment comprising a measuring plunger, an indicator drive including a bell crank lever and a fine adjustment element carried by the gauge cooperating with the lever to impart thereto an adjustment movement independently of the influencing of the measuring plunger, the measuring plunger being reduced at its inner end and guided in a sleeve member provided with a head cooperating with the end part of an indicator gear, and a pressure spring arranged between the reduced portion of the measuring plunger and the sleeve member and an eccentric shaft mounted in the sleeve member, said spring biasing the plunger against the shaft and said shaft extending through the gauge housing.

2. A linear measurement mechanical dial gauge comprising a measuring plunger, an eccentric device within the gauge, means enabling adjustment to be imparted to a dial gauge indicator mechanism independently of movement of the measuring plunger, the measuring plunger being telescopically extensible and retractable and including outer and inner parts through which the eccentric device engages within the gauge, and said device being movable to shift said parts relatively to each other, the outer plunger part having an axial bore extending from its inner end, in which is accommodated a compression spring and a pin forming said inner part, the pin extending beyond the plunger and carrying a head adapted to cooperate with the gauge indicator mechanism, the eccentric device being an eccentric shaft mounted to extend through a gauge housing and provided with a setting knob, and the spring biasing the plunger against the shaft.

3. A linear measurement mechanical dial gauge comprising a measuring plunger, an eccentric device within the gauge, means enabling adjustment to be imparted to a dial gauge indicator mechanism independently of movement of the measuring plunger, the measuring plunger being telescopically extensible and retractable and including outer and inner parts through which the eccentric device engages within the gauge, and said device being movable to shift said parts relatively to each other, the plunger being stepped proximately at its inner end to guide a sleeve member which carries a head adapted to cooperate with the gauge indicator mechanism, a pressure spring, introduced between the step and the sleeve member, and an eccentric device in the form of an eccentric shaft provided for shifting said sleeve and plunger relatively to one another, and engaging the sleeve and plunger arranged to pass through the housing of the gauge to carry a setting knob, said spring biasing the plunger against the shaft.

References Cited in the file of this patent
UNITED STATES PATENTS

| | | | |
|---|---|---|---|
| 900,531 | Hardinge | Oct. 6, | 1908 |
| 1,048,073 | Hirth | Dec. 24, | 1912 |
| 1,218,243 | De Zeng | Mar. 6, | 1917 |
| 2,210,435 | Ruf | Aug. 6, | 1940 |
| 2,254,313 | Poock et al. | Sept. 2, | 1941 |
| 2,324,998 | Dague | July 20, | 1943 |
| 2,384,519 | Aller | Sept. 11, | 1945 |